(12) United States Patent
Chen (10) Patent No.: US 10,628,876 B2
(45) Date of Patent: Apr. 21, 2020

(54) WEBSITE SHOPPING SYSTEM AND SHOPPING METHOD THEREOF

(71) Applicant: Yung-Yen Chen, New Taipei (TW)

(72) Inventor: Yung-Yen Chen, New Taipei (TW)

(*) Notice: Subject to any disclaimer, the term of this patent is extended or adjusted under 35 U.S.C. 154(b) by 344 days.

(21) Appl. No.: 15/664,410

(22) Filed: Jul. 31, 2017

(65) Prior Publication Data

US 2018/0300801 A1 Oct. 18, 2018

(30) Foreign Application Priority Data

Apr. 12, 2017 (TW) ............................. 106112275 A (51) Int. Cl.
*G06Q 30/00* (2012.01)
*G06Q 30/06* (2012.01)
*G06F 3/0482* (2013.01)

(52) U.S. Cl.
CPC ..... *G06Q 30/0643* (2013.01); *G06Q 30/0633* (2013.01); *G06F 3/0482* (2013.01)

(58) Field of Classification Search
None
See application file for complete search history.

(56) References Cited

U.S. PATENT DOCUMENTS

| 2003/0004831 | A1* | 1/2003 | Owens | G06Q 30/02 705/14.4 |
| 2013/0332291 | A1* | 12/2013 | Perez | G06Q 30/0623 705/14.73 |
| 2016/0104229 | A1* | 4/2016 | Craft | G06Q 30/0631 705/26.7 |

* cited by examiner

*Primary Examiner* — Mila Airapetian
(74) *Attorney, Agent, or Firm* — Wang Law Firm, Inc.

(57) ABSTRACT

The present invention discloses a website shopping system and shopping method thereof. The website shopping system comprises a remote server and a smart mobile communication device. The remote server provides a main directory webpage, a subdirectory webpage, a product information webpage, an optional subtotal webpage or a checkout webpage. The smart mobile communication device displays full-size of the main directory webpage, the subdirectory webpage, the product information webpage, the optional subtotal webpage or the checkout webpage, and transmits input information to the remote server.

10 Claims, 7 Drawing Sheets

WEBSITE SHOPPING SYSTEM AND SHOPPING METHOD THEREOF

CROSS-REFERENCE TO RELATED APPLICATION

This application claims priority from Taiwan Application No. 106112275, filed on Apr. 12, 2017, in the Taiwan Intellectual Property Office, the content of which is hereby incorporated by reference in their entirety for all purposes.

BACKGROUND OF THE INVENTION

1. Field of the Invention

The present invention relates a website shopping system and shopping method thereof. In particular, the present invention relates to a website shopping system that is displayed in a browser at its full-size and shopping method thereof.

2. Description of the Related Art

The commercially available application program of the shopping mall need to be downloaded and installed, and thus, it may have a risk of entrainment of viruses in the installation files, and meanwhile, the application program installed may take up the memory space and slow down the operating speed thereof, thereby affecting overall user experience.

Furthermore, if browsing the current webpage of the shopping mall through the website instead of the application program installed, only narratives but not any product image can be presented on the current webpage of the shopping mall, and thus it also may result in had user experience.

SUMMARY OF THE INVENTION

In view of the above-mentioned problems of the conventional art, the object of the present invention is to provide a website shopping system and shopping method thereof, in order to solve the problems of the conventional art.

Based on the above object, the present invention is to provide a website shopping system, comprising a remote server and a smart mobile communication device. The remote server provides a main directory webpage, a subdirectory webpage, a product information webpage, an optional subtotal webpage or a checkout webpage corresponding to a request signal. The smart mobile communication device transmits the request signal to the remote server and opens a browser to display full-size of the main directory webpage, the subdirectory webpage, the product information webpage, the optional subtotal webpage or the checkout webpage. The smart mobile communication device generates another request signal or input information corresponding to the main directory webpage, the subdirectory webpage, the product information webpage, the optional subtotal webpage or the checkout webpage, and transmits the other request signal or the input information to the remote server.

Preferably, the input information may comprise a purchase quantity and recipient information.

Preferably, the main directory webpage may have a plurality of product category options, the request signal is generated after clicking the product category option, and the remote server provides the subdirectory webpage corresponding to the request signal generated after clicking the product category option.

Preferably, the subdirectory webpage may have a plurality of product fields, each of the product fields has a product image, a product information option and a purchase option, and the remote server provides the product information webpage corresponding to the request signal generated after clicking the product information option and provides the optional subtotal webpage corresponding to the request signal generated after clicking the purchase option.

Preferably, the checkout webpage may have a checkout information field and a recipient information field.

Based on the above object, the present invention also provide a website shopping method for a website shopping system, the website shopping system comprises a remote server and an smart mobile communication device, the website shopping method comprises the following steps:

opening a browser of the smart mobile communication device;

generating a first signal, providing a main directory webpage from the remote server, and displaying full-size of the main directory webpage in the browser;

generating a second request signal, providing a subdirectory webpage from the remote server, and displaying full-size of the subdirectory webpage in the browser;

generating a third request signal, providing an optional subtotal webpage from the remote server, and displaying full-size of the optional subtotal webpage in the browser;

inputting a purchase quantity in the optional subtotal webpage;

generating a fourth request signal, providing a checkout webpage from the remote server, and displaying full-size of the checkout webpage in the browser; and inputting recipient information in the checkout webpage.

Preferably, the main directory webpage may have a plurality of product category options, the website shopping method comprises the following steps:

clicking the product category option to generate the second request signal; and providing the subdirectory webpage corresponding to the second request signal generated after clicking the product category option.

Preferably, the subdirectory webpage may have a plurality of product fields, each which has a product image and a product information option, the website shopping method comprises the following steps:

clicking the product information option to generate a fifth request signal; and providing a product information webpage corresponding to the fifth request signal generated after clicking the product information option.

Preferably, the subdirectory webpage may have a plurality of product fields, each which has a product image and a purchase option, the website shopping method comprises the following steps:

clicking the purchase option to generate the third request signal; and providing the optional subtotal webpage corresponding to the third request signal generated after clicking the purchase option.

As mentioned above, the website shopping system and shopping method of the present invention do not need to download the installation file and install the application program, thereby preventing risk of entrainment of viruses in the installation files and reducing burden on the memory so as to improve the running speed thereof. On the other hand, the product image is shown in the webpage with reference to the text message, such that the consumer can better understand the product information, and the webpage can be scaled automatically so as to achieve the object of browsing the webpage at its full-size.

DETAILED DESCRIPTION OF THE PREFERRED EMBODIMENTS

For a better understanding of the features, contents and advantages of the present invention, and the effect that may be achieved therefrom, the present embodiments of the present invention are described in more detail as follows with reference to the accompanying drawings. It should be noted that the drawings and exemplary embodiments herein are used for the purpose of illustrating and explaining the present invention, without necessarily implying the actual ratio and the precise configuration. Therefore, in the accompanying drawings, the ratio and the configuration shall not be interpreted in any way that limits the scope of the present invention For a better understanding of the technical methods, and the advantages and features that may be achieved therefrom, which are described in more detail with reference to the exemplary embodiments and the accompanying drawings, and the present invention may be implemented in different forms and thus should not be limited to the embodiments herein, on the contrary, the embodiments are provided to make the present invention more clear and comprehensive, and the scope of the present invention is fully conveyed to one skilled in the art, and the present invention is defined only by the accompanying claims.

Figure 1:
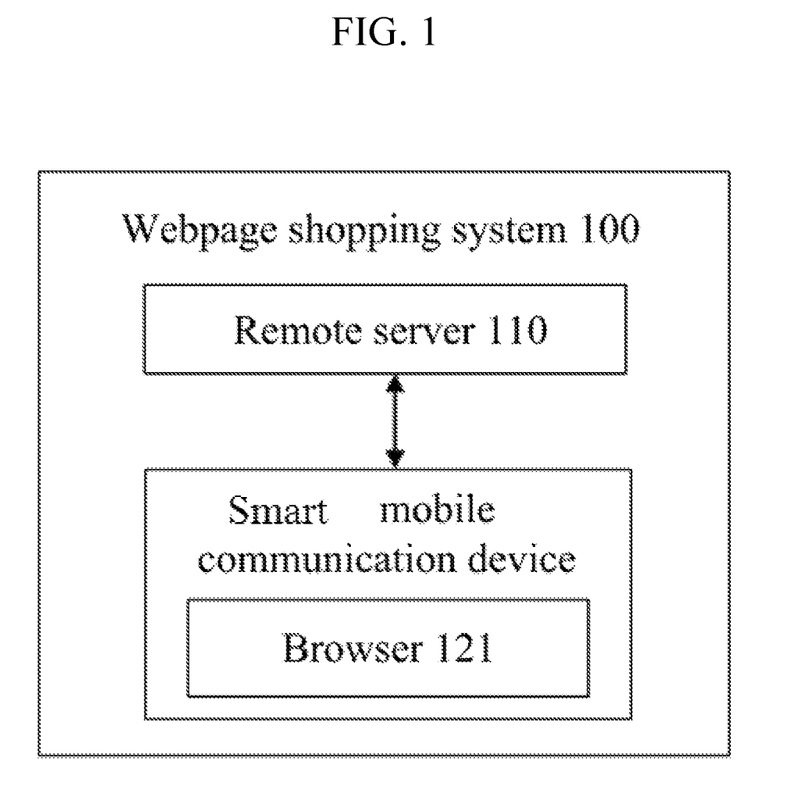
FIG. 1 is a block diagram of the website shopping system of the present invention.

Please refer to FIG. 1, which is a block diagram of the website shopping system of the present invention. As shown in FIG. 1, the website shopping system 100 of the present invention comprises a remote server 110 and a smart mobile communication device 120. The remote server 110 is linked to the smart mobile communication device 120 through network, and the smart mobile communication device 120 may be a smartphone or a tablet computer.

Further, the remote server 110 provides a main directory webpage, a subdirectory webpage, a product information webpage, an optional subtotal webpage or a checkout webpage, corresponding to a request signals. If desired, the image may be placed into the aforementioned webpages. The smart mobile communication device 120 transmits the request signal to the remote server 110, and opens a browser 121 to display full-size of the main directory webpage, the subdirectory webpage, the product information webpage, the optional subtotal webpage or the checkout webpage. The smart mobile communication device 120 generates another request signal or input information, corresponding to the main directory webpage, the subdirectory webpage, the product information webpage, the optional subtotal webpage or the checkout webpage, and transmits the other request signal or the input information to the remote server 110.

Further, the input information may comprise a purchase quantity and recipient information, such as a name, an address, a contact mode, credit card related information, a store name of a convenience store for pickup etc.

Figure 2:
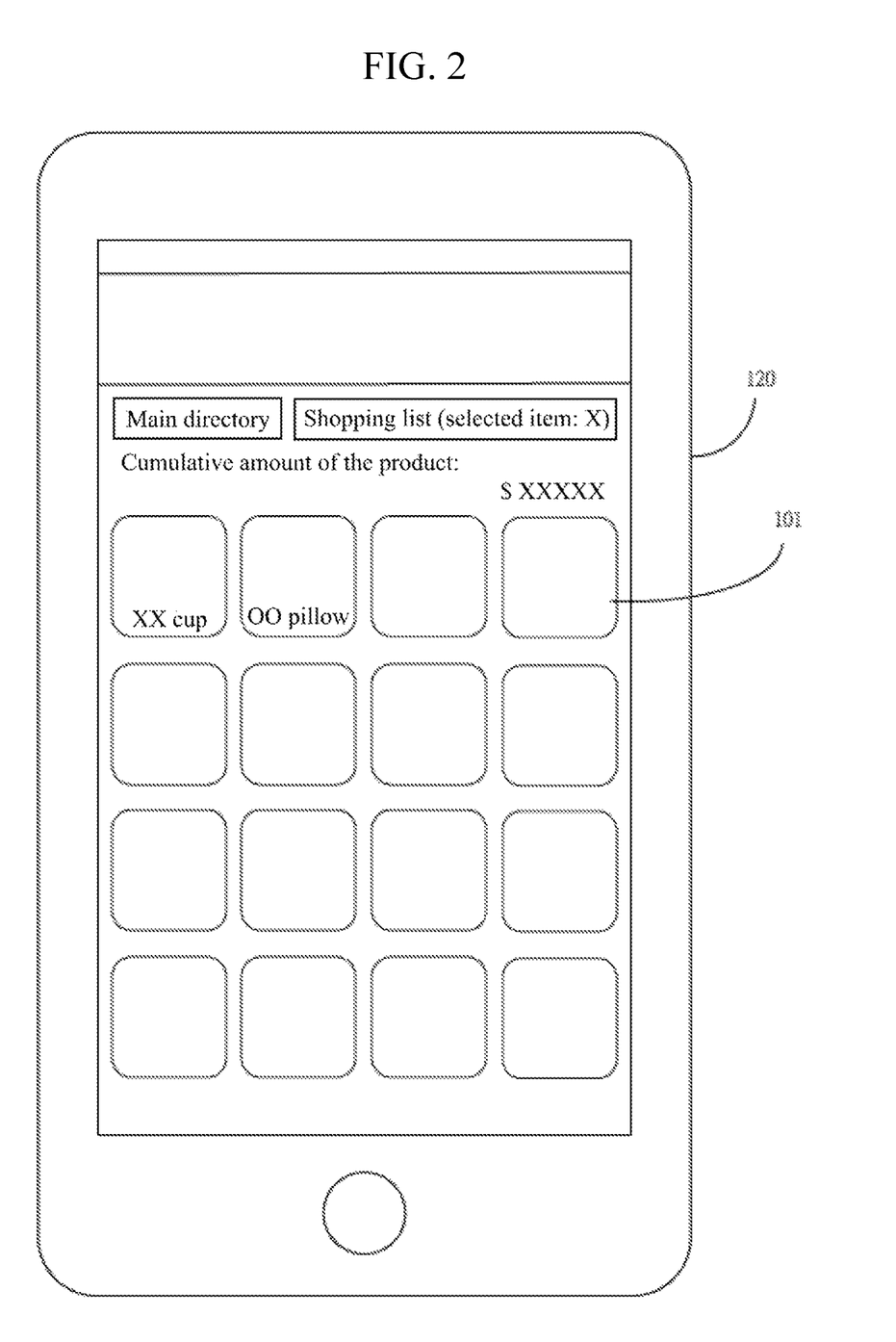
FIG. 2 is a schematic view of the main directory webpage of the website shopping system of the present invention.

Please refer to FIG. 2, which is a schematic view of the main directory webpage of the website shopping system of the present invention. As shown in FIG. 2, full-size of the main directory webpage displayed by the browser of the mobile communication device 120 may have a plurality of product category options 101. The smart mobile communication device 120 generates the request signal and transmits it to the remote server 110 after clicking the product category option 101. The remote server 110 receives the request signal and then provides the subdirectory webpage (as shown in FIG. 3) corresponding to the request signal generated after clicking the product category option 101.

Figure 3:
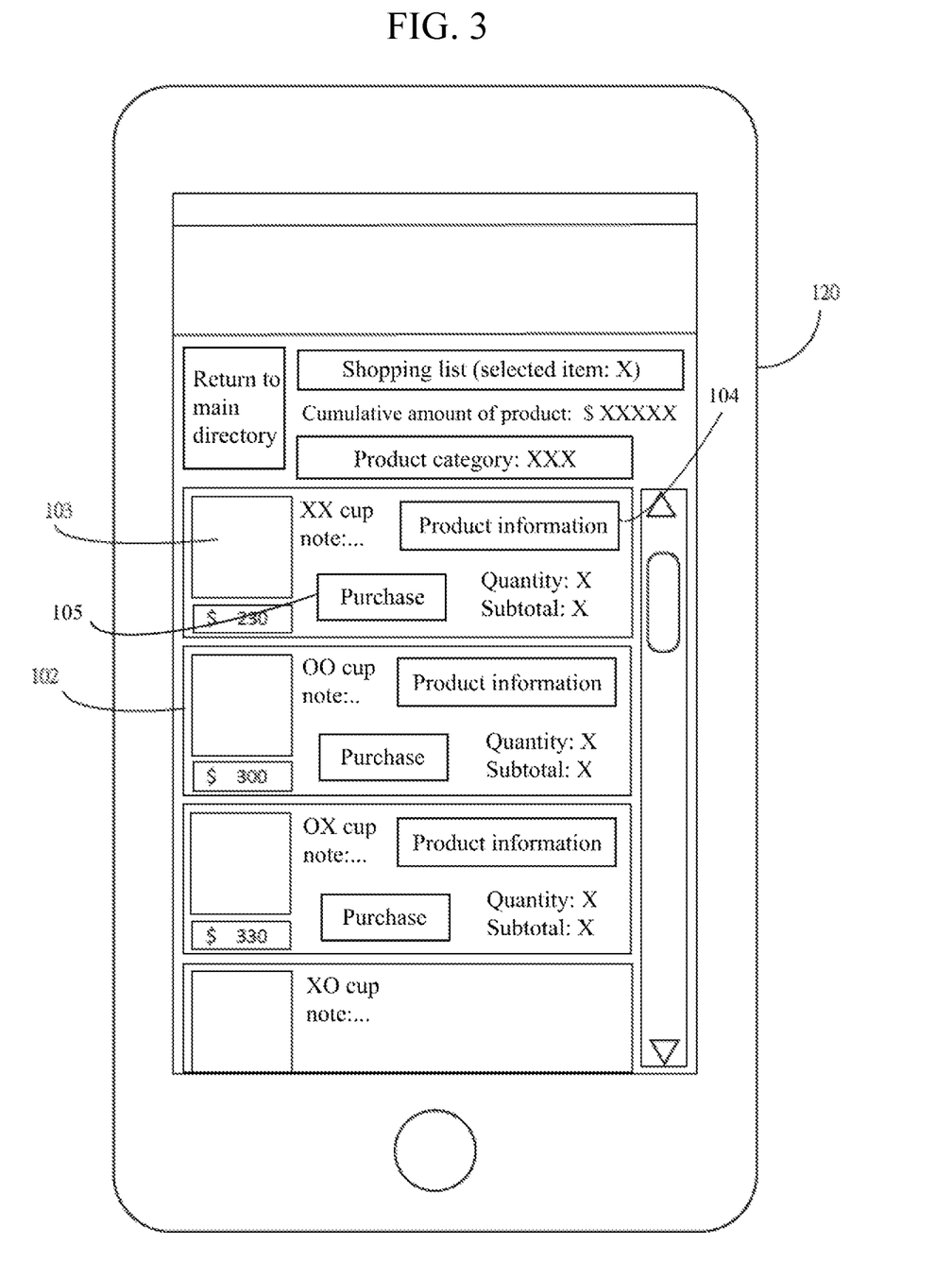
FIG. 3 is a schematic view of the subdirectory webpage of the website shopping system of the present invention.
Figure 4:
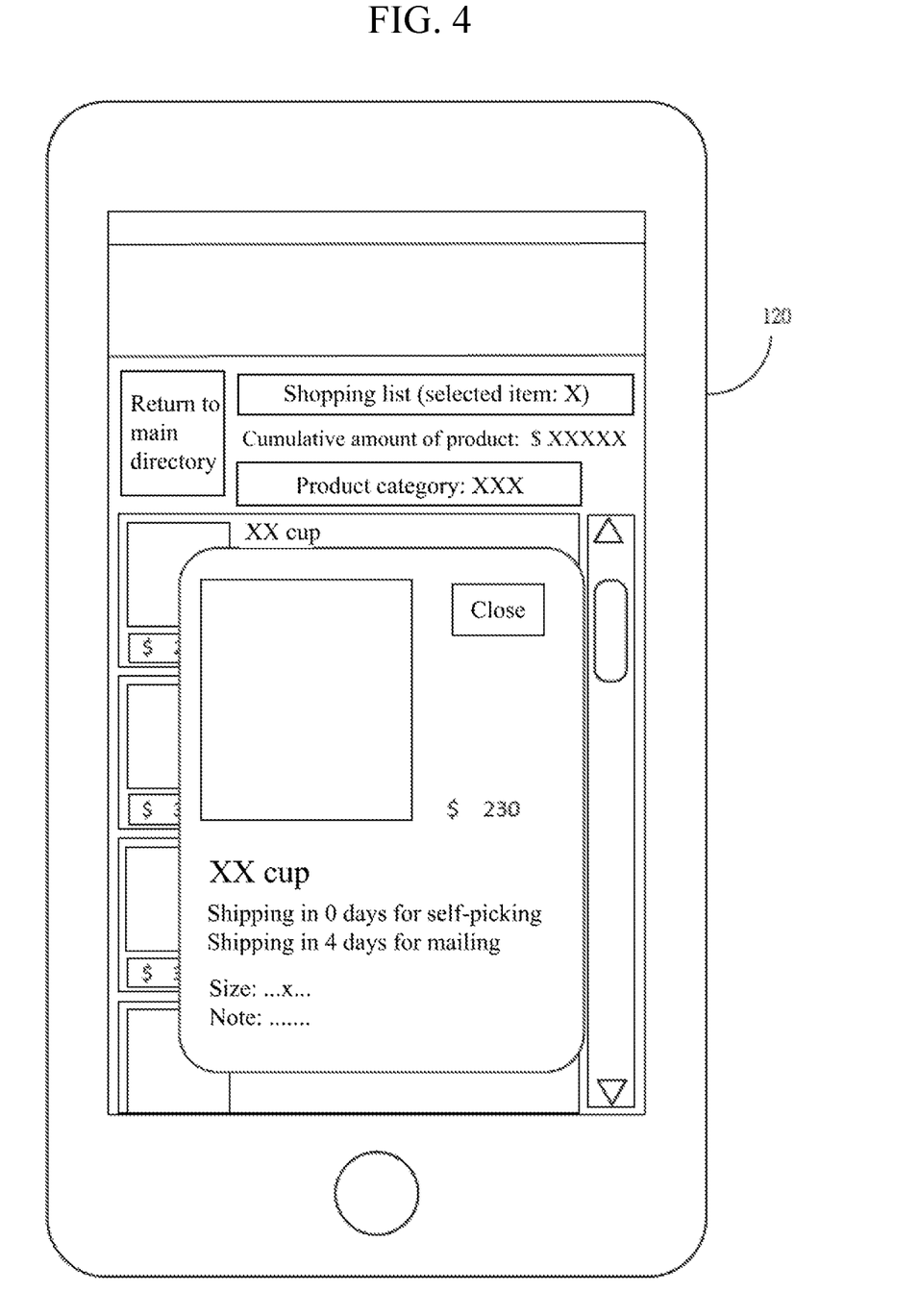
FIG. 4 is a schematic view of the product info ion webpage of the website shopping system of the present invention.

Please refer to FIG. 3, which is a schematic view of the subdirectory webpage of the website shopping system of the present invention. As shown in FIG. 3, full-size of the subdirectory webpage displayed by the browser of the smart mobile communication device 120 may have a plurality of product fields 102, and each of the product fields has a product image 103, a product information option 104 and a purchase option 105. The smart mobile communication device 120 generates the request signal and transmits it to the remote server 110. The remote server 110 receives the request signal and then provides the product information webpage (as shown in FIG. 4) corresponding to the request signal generated after clicking the product information option 104. Next, the smart mobile communication device 120 generates the request signal and transmits it to the remote server 110. The remote server 110 receives the request signal and then provides the optional subtotal webpage (as shown in FIG. 5) corresponding to the request signal generated after clicking the purchase option 105.

Please refer to FIG. 4, which is a schematic view of the product information webpage of the website shopping system of the present invention. As shown in FIG. 4, full-size of the product information displayed by the browser of the smart mobile communication device 120 may include the detailed product information, such as a size, price, a shipping time or text notes etc.

Figure 5:
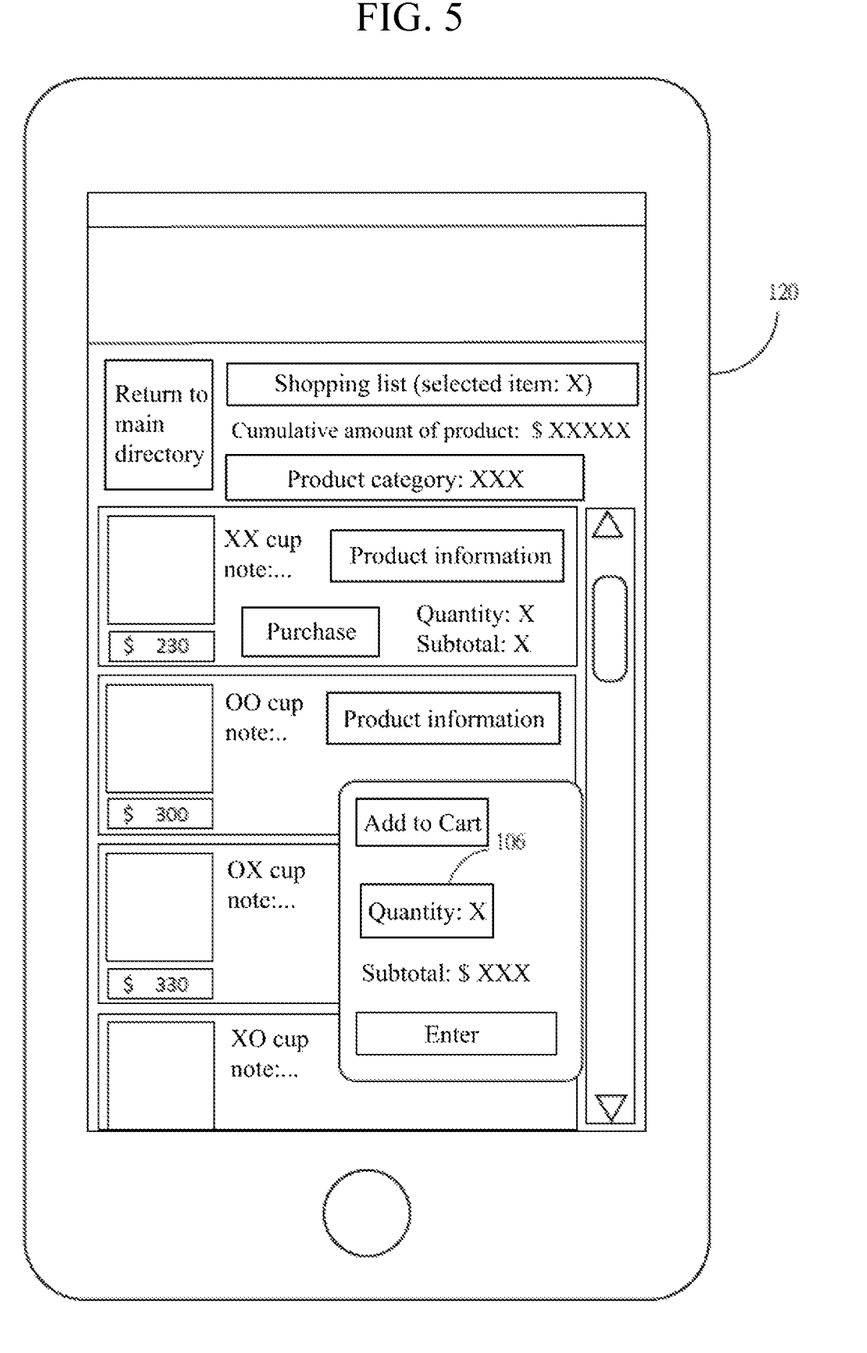
FIG. 5 is a schematic view of the optional subtotal webpage of the website shopping system of the present invention.

Please refer to FIG. 5, which is a schematic view of the optional subtotal webpage of the website shopping system of the present invention. As shown in FIG. 5, full-size of the optional subtotal webpage displayed by the browser of the smart mobile communication device 120 may include a quantity field 106 filled with a purchase quantity therein and the subtotal amount of money.

Figure 6:
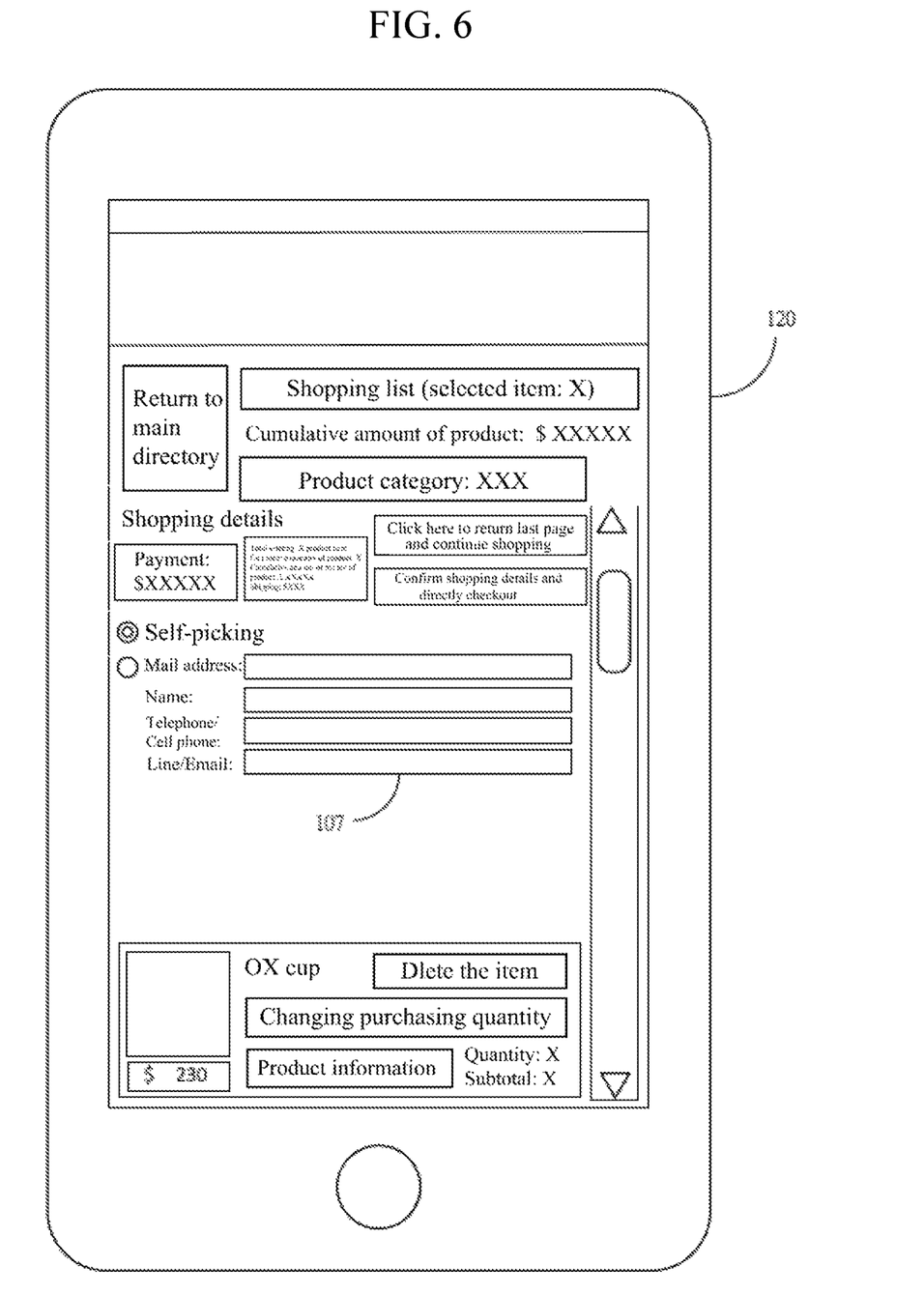
FIG. 6 is a schematic view of the checkout webpage of the website shopping system of the present invention.

Please refer to FIG. 6, which is a schematic view of the checkout webpage of the website shopping system of the present invention. As shown in FIG. 6, full-size of the checkout webpage displayed by the browser of the smart mobile communication device 120 may provide fields 107 to the consumer to fill checkout information and recipient information therein. The consumer may confirm and commit the transaction after filling the relative information to complete shopping.

Although the concept of the website shopping method of the present invention has been described in the above description of the website shopping system of the present invention, the detailed illustration of the flowchart will be shown as below for sake of clarity.

Figure 7:
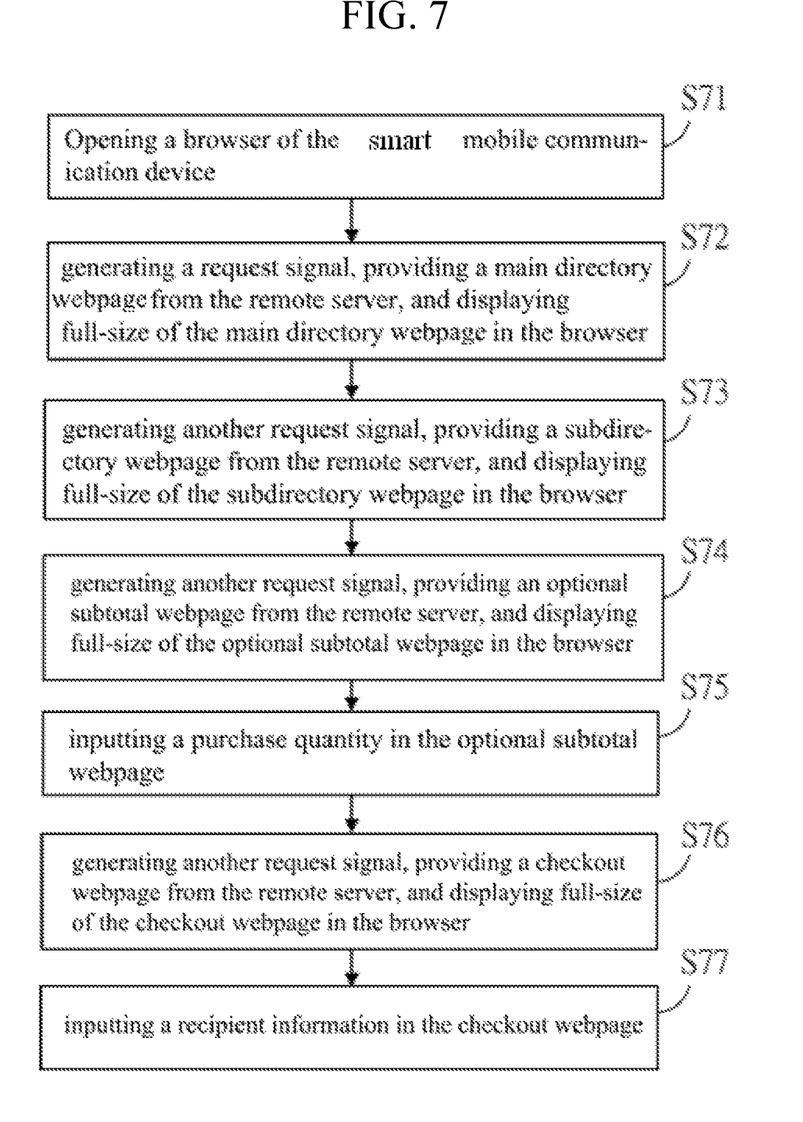
FIG. 7 is a flowchart of the website shopping method of the present invention.

Please refer to FIG. 7, which is a flowchart of the website shopping method of the present invention. As shown in FIG. 7, the website shopping method of the present invention is used for the website shopping system described above, which comprises the remote server and the smart mobile communication device, and the website shopping method of the present invention comprises the following steps:

At step S71: opening the browser of the smart mobile communication device.

At step S72: generating the first request signal, providing the main directory website from the remote server, and displaying full-size of the main directory website in the browser. The first request signal is generated by the mobile communication device and transmitted to the remote server.

At step S73: generating the second request signal, providing the subdirectory webpage from the remote server, and displaying full-size of the subdirectory webpage in the browser. The second request signal is generated by the mobile communication device and transmitted to the remote server.

At step S74: generating the third request signal, providing the optional subtotal webpage from the remote server, and displaying full-size of the optional subtotal webpage in the browser. The third request signal is generated by the mobile communication device and transmitted to the remote server.

At step S75: inputting the purchase quantity in the optional subtotal webpage. The purchase quantity inputted as input information is transmitted to the remote server such that an amount of money may be calculated by the remote server. It is worth noting that if the purchase quantity reaches a certain amount, the remote server provides the corresponding discount offer, and calculates an amount of money depending on the purchase quantity and the discount offer.

At step S76: generating the fourth request signal, providing a checkout webpage from the remote server, and displaying full-size of the checkout webpage in the browser. The fourth request signal is generated by the mobile communication device and transmitted to the remote server.

At step S77: inputting the recipient information in the checkout webpage. The recipient information inputted as input information is transmitted to the remote server.

Correspondingly, the main directory website may have the plurality of product category options, the website shopping method comprises the following steps:

clicking the product category option to generate the second request signal;

providing the subdirectory webpage corresponding to the second request signal generated after clicking the product category option.

The subdirectory webpage may have a plurality of product fields, each which has the product image and the product information option, the website shopping method comprises the following steps:

clicking the product information option to generate the fifth request signal;

providing a product information webpage corresponding to the fifth request signal generated after clicking the product information option.

The subdirectory webpage may have a plurality of product fields, each of the product fields has the product image and the purchase option, and the website shopping method comprises the following steps:

clicking the purchase option to generate the third request signal;

providing the optional subtotal webpage corresponding to the third request signal generated after clicking the purchase option.

As mentioned above, the detailed illustration and implementation of the website shopping method of the present invention has been described in the above description of the website shopping system of the present invention, and their details are not repeated here for the sake of simplicity.

As mentioned above, the website shopping system and shopping method of the present invention do not need to download the installation file and install the application program, thereby preventing risk of eminent of viruses in the installation files and reducing burden on the memory so as to improve the running speed thereof On the other hand, the product image is shown in the webpage with reference to the text message, such that the consumer can better understand the product information, and the webpage can be scaled automatically to achieve the object of browsing the webpage at its full-size.

The above-described embodiments are merely the illustration of the technical concept and features to achieve the object of making one skilled in the art understand the content of the present invention and carry out it, and the scope of the present invention is not limited thereto. Any equivalent modification or change may be made thereto without departing from the spirit of the present invention and is covered by the appended claims.

What is claimed is:

1. A website shopping system, comprising:
a remote server, providing a main directory webpage, a subdirectory webpage, a product information webpage, an optional subtotal webpage or a checkout webpage corresponding to a request signal; and
an smart mobile communication device, transmitting the request signal to the remote server, and opening a browser to display full-size of the main directory webpage, the subdirectory webpage or the checkout webpage, wherein the smart mobile communication device generates another request signal or input information corresponding to the main directory webpage, the subdirectory webpage, the product information webpage, the optional subtotal webpage or the checkout webpage, and transmits the other request signal or the input information to the remote server;
wherein the product information webpage or the optional subtotal webpage are overlaid on the subdirectory webpage with a smaller area than the subdirectory webpage while displayed on the smart mobile communication device, such that at least a portion of the subdirectory webpage is not obscured by the product information webpage or the optional subtotal webpage.

2. The website shopping system of claim 1, wherein the input information comprises a purchase quantity and recipient information.

3. The website shopping system of claim 1, wherein the main directory webpage has a plurality of product category options, the request signal is generated after clicking the product category option, and the remote server provides the subdirectory webpage corresponding to the request signal generated after clicking the product category option.

4. The website shopping system of claim 1, wherein the subdirectory webpage has a plurality of product fields, each of the product fields has a product image, a product information option and a purchase option, and the remote server provides the product information webpage corresponding to the request signal generated after clicking the product information option and provides the optional subtotal webpage corresponding to the request signal generated after clicking the purchase option.

5. The website shopping system of claim 1, wherein the checkout webpage has a checkout information field and a recipient information field.

6. A website shopping method for a website shopping system, the website shopping system comprises a remote server and an smart mobile communication device, the website shopping method comprises the following steps:

opening a browser of the smart mobile communication device;

generating a first request signal, providing a main directory webpage from the remote server, and displaying full-size of the main directory webpage in the browser;

generating a second request signal, providing a subdirectory webpage from the remote server, and displaying full-size of the subdirectory webpage in the browser;

generating a third request signal, providing an optional subtotal webpage from the remote server, and displaying the optional subtotal webpage in the browser;

inputting a purchase quantity in the optional subtotal webpage;

generating a fourth request signal, providing a checkout webpage from the remote server, and displaying full-size of the checkout webpage in the browser; and inputting recipient information in the checkout webpage;

wherein the optional subtotal webpage is overlaid on the subdirectory webpage with a smaller area than the subdirectory webpage while displayed on the smart mobile communication device, such that at least a portion of the subdirectory webpage is not obscured by the optional subtotal webpage.

7. The website shopping method of claim 6, wherein the main directory webpage has a plurality of product category options, the website shopping method comprises the following steps:

clicking the product category option to generate the second request signal; and providing the subdirectory webpage corresponding to the second request signal generated after clicking the product category option.

8. The website shopping method of claim 6, wherein the subdirectory webpage has a plurality of product fields, each which has a product image and a product information option, the website shopping method comprises the following steps:

clicking the product information option to generate a fifth request signal; and providing a product information webpage corresponding to the fifth request signal generated after clicking the product information option;

wherein the product information webpage is overlaid on the subdirectory webpage with a smaller area than the subdirectory webpage while displayed on the smart mobile communication device, such that at least a portion of the subdirectory webpage is not obscured by the product information webpage.

9. The website shopping method of claim 6, wherein the subdirectory webpage has a plurality of product fields, each which has a product image and a purchase option, the website shopping method comprises the following steps:

clicking the purchase option to generate the third request signal; and providing the optional subtotal webpage corresponding to the third request signal generated after clicking the purchase option.

10. The website shopping method of claim 6, wherein the checkout webpage has a checkout information field and a recipient information field.

* * * * *